March 27, 1956   J. W. PEDLOW ET AL   2,739,829
PLASTIC PIPE JOINT
Filed Aug. 5, 1950

INVENTORS.
JOHN WATSON PEDLOW
LESTER B. CUNDIFF
BY Thomas R. O'Malley
ATTORNEY.

United States Patent Office 2,739,829
Patented Mar. 27, 1956

2,739,829

PLASTIC PIPE JOINT

John Watson Pedlow, Media, Pa., and Lester B. Cundiff, Wilmington, Del., assignors to American Viscose Corporation, Wilmington, Del., a corporation of Delaware Application August 5, 1950, Serial No. 177,786

13 Claims. (Cl. 285—115)

The present invention relates to forming joints in pipes or tubes of non-metallic material, particularly of a material which is sensitive to heat and to swelling agents.

Tubings comprising chemically or corrosion-resistant organic resinous materials such as polyethylene, polyvinylchloride, polyvinylidene chloride are being used in increasing quantity to handle liquids and gases which cause rapid deterioration of metallic tubes and piping. However, the difficulty in forming satisfactory joints and bends, and otherwise assembling fluid-conducting systems comprising such non-metallic materials has considerably hampered the substitution thereof for the less durable metallic tubes and pipes. Because of the softness and resiliency and the readiness with which the non-metallic materials develop splitting or tearing planes when cut, grooved, threaded, etc., conduit systems comprising such materials are not readily assembled by the conventional pipe-working tools and equipment, or portions of such systems joined by conventional pipe fittings and assembly methods.

Methods of the prior art for forming joints in tubes of thermoplastic materials, such as polymers of ethylene, styrene, vinyl chloride, and ethyl or methyl methacrylate, include the method wherein a welding rod comprising the material of the tubes to be joined, is fused and laid along a groove formed by the abutment of two tube ends having beveled edges. Various portable devices are available for heating air or a gas and discharging it in a jet directed against the welding rod and the tube ends to obtain proper fusion and plasticization. Another method involves heating the ends of the tube sections to be joined by a hot plate placed therebetween until the material of the tubes is plastic, removing the plate, and bringing the heated ends together. Such methods require considerable skill and, moreover, seldom result in joints which do not have a bead along the inner surface of the joint. Moreover, it is difficult to make joints by these methods which are substantially as strong as the tube.

It is an object of the invention to provide a rapidly and easily executed method of connecting tube sections which comprise a resinous thermoplastic organic material of the type for which there is a known volatile swelling agent. It is another object to produce sealed joints which have substantially as much strength as the tubes connected by the joints. It is also an object to connect tubes and thermoplastic organic materials in joints of which the inner surfaces are substantially as smoothly contoured as the inner surface of a jointless tube. Another object is to produce the joints rapidly and inexpensively with portable equipment without the need of considerable skill so that the method of the invention may be readily utilized in on-the-job construction of conduit systems. Other objects, features and advantages will be apparent from the following description of the invention and the drawing relating thereto in which:

The present invention utilizes the thermoplastic properties and the swelling characteristics of a number of chemically inert resinous organic materials that may be extruded into corrosion-resistant tubing. In accordance with the invention, a pipe joint is formed in tubing or pipes of these materials, the joint comprising a tube end-portion and a sleeve or another tube having a normal internal periphery smaller than the external periphery of the tube and constituted preferably of the same organic resinous material as the tube, the sleeve having been swollen before insertion of the tube end-portion thereinto by application of a volatile swelling agent until its internal periphery is greater than the external periphery of the tube. Assembly of the joint is effected by insertion of the tube end portion into the swollen sleeve and thereafter permitting evaporation of the swelling agent so as to shrink the sleeve tightly around the tube portion in telescopic relationship therewith. In the preferred embodiment of the invention, a circularly continuous metallic band or bands extends around the portion of each tube overlapped by the sleeve. The band or bands are thereafter heated inductively to fuse the adjacent material of the tube and the sleeve to form continuously circular welded regions which strengthen and positively seal the joint.

Figure 1:
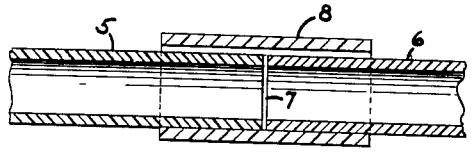
Fig. 1 illustrates in section the end-portions of tubes in abutting relationship, and an expanded sleeve in position for making the joint.

Fig. 1 illustrates two tube sections 5 and 6 with their ends in abutting relationship at 7. Extending around them is a tube or sleeve 8 shown in the dilated condition resulting from absorption of a liquid swelling agent. In its normal unswollen condition, the sleeve 8 may comprise a section tubing of the same internal and external diameters as the tubes 5 and 6, or of the same stock as the tubes. However, the sleeve need not comprise tubing of similar cross section as long as its internal diameter in the undilated condition is less than the external diameters of the tubes 5 and 6. The swelling agents which are used in the practice of this invention are highly volatile so that the shrinking of the sleeves may be effected as rapidly as possible. The swelling agents are also of such a character that the chemical and physical properties of the material comprising the sleeve are practically unimpaired from the absorption thereof and the sleeve will return to its normal dimensions if permitted to shrink without restraint.

Figure 2:
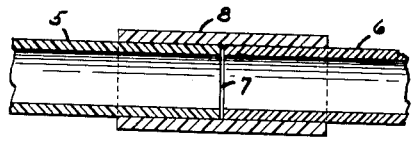
Fig. 2 is a section illustrating the sleeve of Fig. 1 shrunk into place about the tubes.

Fig. 2 illustrates the completed pipe joint in the form in which it occurs after shrinking of the sleeve 8 is completed. The sleeve 8 may overlap the ends of the tubes 5 and 6 in telescopic relationship to any extent desired. A sleeve length of 5 inches is found very satisfactory when using two inch polyethylene tubing having an external diameter of 2⅜ inches, the sleeve may, though not necessarily, comprise a section of tubing similar to that constituting the tubes being joined. Such a joint will readily withstand pressure up to 35 pounds per square inch with failure at higher pressures occurring by separation of the abutting ends of the tubes 5 and 6 within the sleeve 8. The ratio between the length of the sleeve portion which overlaps a tube and the tube may be reduced in accordance to the size of the tubing being joined. For example, when joining tubes in the smaller sizes, i. e. up to 3 inches in internal diameter, the overlapping sleeve section is preferably about one tube diameter in length; when forming joints in tubing having a diameter in the range of 5 to 10 inches the length of the overlapping section need not be greater than about one half the tube diameter.

Figure 3:
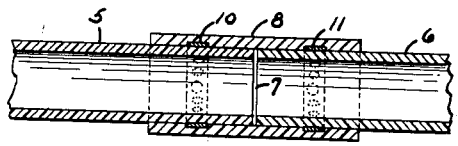
Fig. 3 is a section illustrating abutting end-portions of tubes in welded relationship with a sleeve and metallic bands extending through the welded portions.

Fig. 3 illustrates in section a joint comprising metallic bands 10 and 11 about which the sleeve 8 has shrunk to embed the bands within the adjacent surfaces of the sleeve and the tubes. The bands 10 and 11 extend circularly through fused regions of the joint, each region comprising material of the sleeve and the adjacent tube which has flowed together, or become adhesively attached to the band. The welded regions are produced by heating of the metallic elements by means of an induction heater which may be placed around the joint in proximity to the band. The bands 10 and 11 are preferably of very thin material so that they have low heat capacity and do not store enough heat to bring about overheating effects in the organic material of the tubing and the sleeve after a fusion temperature of the material is reached and the source of inductive power is removed. The bands are preferably a quarter of an inch in width or more so that ample areas of the sleeve and tube adjacent the band will be heated to produce a strong weld therebetween. The band is preferably extensively perforated, the perforations being preferably numerous rather than large so that the metal of the band is well distributed and the many small areas adjacent the metal will quickly reach the fusion point. In the joint of Fig. 3 as well as in all of the joints hereinafter described which comprise metallic bands inserted between overlapping tube portions, each band is disposed as shown in the figures in spaced relation with the ends of the overlapping tube portions which constitute a joint comprising such a band. As shown in Figs. 3, 4, 8, 9, and 10, the portion terminating in an end surface of each tube in each joint extends beyond that section of the tube in radial concentric relation with each band.

Figure 5:
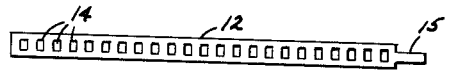
Fig. 5 is a plan view of a metallic element used to form the bands of the tube joints.
Figure 6:
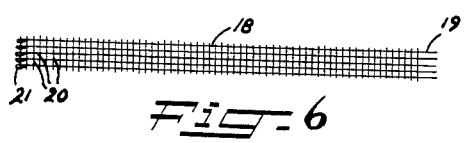
Fig. 6 is a plan view of a modified element from which to make bands.
Figure 7:
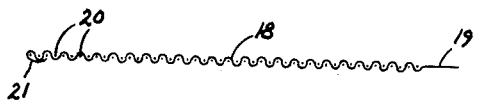
Fig. 7 is a side view of the element shown in Fig. 6.

Figs. 5, 6 and 7 illustrate two types of elements useful as bands which have been found very satisfactory in the practice of the invention. The element 12 illustrated in Fig. 5 is perforated throughout its length by small oblong apertures 14 having sufficient length in the direction laterally of the element to receive a tab or tip 15. Since tubes of organic thermoplastic material are seldom supplied in uniform diameter, such elements as 12 are easily formed into bands about the end-portions of the tube prior to the insertion thereof into a sleeve regardless of variations in the tube diameter. The tab 15 is of sufficient length and the holes are spaced sufficiently close together to permit insertion of the tab through the appropriate perforation to obtain a tight fit of the band about a tube.

Figs. 6 and 7 illustrate an element comprising a small section of metallic screen which is highly satisfactory because of the favorable disposition of the metallic surface relative to the engaged surfaces of the sleeve and the tube. In preparing such element 18 of Figs. 6 and 7 from a sheet of a screen for use as a band, cross-wires are removed near one end to leave end portions 19 projecting from the element which may be inserted behind cross-wires 20 of the other end in forming the band. The tips of the longitudinal wires 21 should be bent back on themselves at the ends so as to lock the cross-wires of this end of the element from being pulled loose from the band after the tips 19 are passed through this end and clinched around the cross-wires. When elements are to be provided in large quantity, screen sheet is provided in the proper width having a selvage edge. As the selvage edge occurs at the end of the element 18 corresponding to the wire tips 21, it is not necessary to bend the tips back on themselves.

Figure 4:
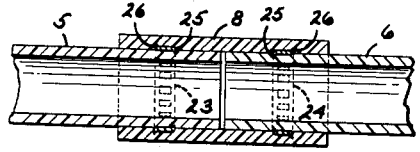
Fig. 4 illustrates a joint comprising modified metallic bands.

Fig. 4 illustrates a pipe joint in which a modified type of band is used. Prior to inserting the end portions of tubes 5 and 6 into the sleeve 8, each tube portion is provided with a band 23 or 24 having a radially inwardly-extending edge 25 which tends to grip the tube, and an edge 26 extending radially outward which tends to grip the sleeve. Under pressure the joint tends to separate by movement of the tubes 5 and 6 away from each other and lengthwise of the sleeve 8. The elements 23 and 24 are adapted to dig into the facing surfaces of the tubes and the sleeve. The bands 23 and 24 are mounted so that the inwardly extending edge is toward the region of the abutment of the tube ends. A joint having such bands is somewhat stronger and more leak-proof than the joint illustrated in Fig. 2. Its strength and resistance to leaking may be increased by subjecting it to induction heating as described with respect to the joint of Fig. 3.

Figure 8:
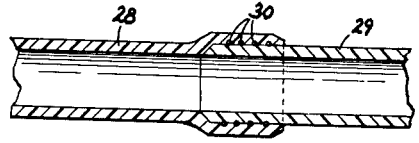
Fig. 8 is a section view of a pipe joint in which the end portion of one tube overlaps the end portion of another tube and the metallic band comprises windings of wire.

Fig. 8 illustrates still another type of joint in accordance with the invention in which the end of a tube 28 has been dilated with a volatile swelling agent and mounted in overlapping relationship with the end of a tube 29 and allowed to shrink by conformity with the outer surface thereof. However, previous to the insertion of tube 29 into the swollen end of tube 28, the tube 29 is wrapped with several windings 30 of fine wire. The windings 30 may constitute one continuous length of wire. However, the ends of the wire must be fastened together in order that a current will be induced therein when an induction heater is positioned around the joint. The joint may be sealed and strengthened by heating the wire to sufficiently fuse the portions of the two tubes adjacent the wire.

Figure 9:
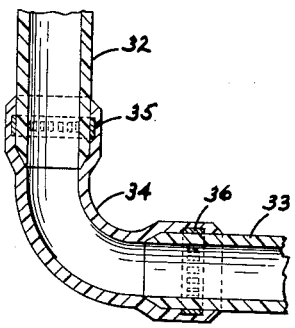
Fig. 9 is a section view of a pipe joint for connecting tubes in angular relationship.
Figure 10:
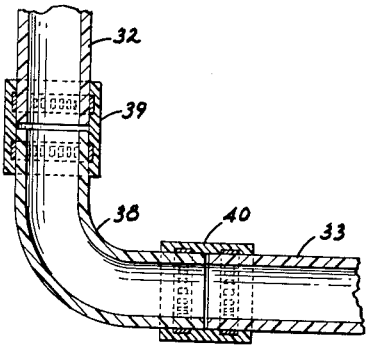
Fig. 10 is a section view of a modified joint for connecting tubes in angular relationship.

Fig. 9 illustrates straight tubing sections 32 and 33 disposed at an angle relative to one another and connected by a preformed curved tube section 34 which prior to assembling the joint may be swelled sufficiently for insertion of the end portions of tubes into the ends of the curved section. The swelling agent thereafter evaporates from the section 34 which shrinks tightly around the ends of the tubes 32 and 33. Metallic bands 35 and 36 are included between and embedded within the adjacent surfaces of the overlapping portions of the tube sections as the section 34 shrinks. When the bands are inductively heated sufficiently to fuse the portions of the tubes adjacent thereto, a welded and sealed joint is formed. Fig. 10 illustrates a curved pipe joint wherein a curved pipe section 38 is connected with the straight sections 32 and 33 by means of sleeves 39 and 40 shrunk into overlapping relationship with the ends of the tube sections. In either of the joints depicted in Figs. 9 and 10, a smoothly contoured fluid conducting surface is obtained characterized by an absence of such fluid flow obstructions as an internal bead, changes of internal diameter, or sharp bends.

In practicing the present invention, a sleeve is shrunk tightly around the surfaces of the tube portions and one or more bands extending around each tube portion. Any band included between the tube portions is embedded within the adjacent surface of such tube portions. When induction heating is thereafter applied to heat the metallic bands, any appreciable fusion which extends in a completely continuous and circular path along each band produces a sealed joint. In the absence of welding, the presence of the band between the tube portions and the sleeve is a considerable factor in preventing slippage therebetween. However, the joint may be made still stronger by heating of the bands sufficiently to produce fusion of the sleeve and the tube portions. This result is obtained primarily because of the shrink fit between the sleeve and the other elements of the joint. Previous attempts to form joints by induction heating technique have failed primarily because the surfaces of the tube ends and sleeve could not be brought together with sufficient tightness to produce continuous welding necessary for a sealed joint, and even if a seal was obtained, such joints lacked the strength necessary to prevent longitudinal slippage or parting of the tubes within the sleeve.

The metallic bands used in the joints described herein may cause non-uniform heating of the tube material if certain precautions are not taken. Overheating is most likely to occur where the ends of the strip material comprising the band are joined. Overheating at the band joint may be eliminated readily by soldering or welding the ends together to form the joint of the band but since there is variation in both the inner and outer diameters of commercially produced tubing of organic thermoplastic materials, it is quite difficult in assembling a conduit system to supply preformed bands with soldered or welded joints. It is preferred practice to apply a strip of material to the end portions of the tubes to be joined which can be readily formed into tightly fitting bands by readily connecting the ends of the strip. However, if the current induced within the band is sufficient to heat the body of the band, there is a possibility that the current carrying capacity provided by contact of the joined ends of the band is much less than the current carrying capacity of other sections of the band. If the induced currents pass through a relatively small area of contact between the joined ends, overheating will occur which may tend to decompose or gasify the thermoplastic material.

For this reason, it is desirable to use a very thin material for the band so that, for example, when a tab comprising one end of the band is inserted through a hole at the end portion of the other band, the tab may be doubled back flatly into efficient contact with the material of the other end of the band. With a thin material, the contact of the joint is increased as the construction of the sleeve around the band results in the joined band ends being pressed together more easily.

Figure 11:
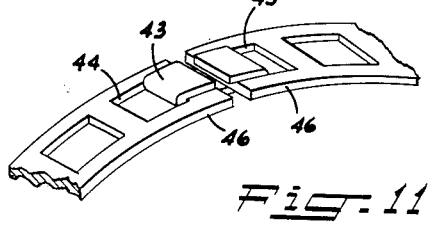
Fig. 11 is a fragmentary pictorial view illustrating the connecting of the end portions of strip material to form a band.

Overheating at the band joint may be controlled also by extensively perforating the strip material used in forming the bands so that the cross-section of metallic area is greatly reduced in comparison with a solid metallic band. In this manner, current carrying capacity of the joint and the other sections of the band may be approximately equalized. For example, in the practice of the invention, very satisfactory bands were formed from metallic strip material having a width of ⅜ of an inch and closely spaced perforations ⅞₂ of an inch in width in the direction transversely of the band. This strip was cut into sections of any desired length such as section 46 of Fig. 11. The section is formed into a band connecting the ends thereby by a tab 43 extending through holes 44 and 45 adjacent each end. The tab has a width of ⅜₆ of an inch and the end portions are folded back on itself. To prevent overheating at the joint of the band 46, it is important that there be ample contact between the tab and the end portions of the strip section 46. It is preferable for this reason that the tab has a width nearly equal to that of the perforations and that the perforations have a straight side, such as obtained with square or rectangular perforations, for engaging the tab folded therearound. Any metallic current-conducting material may be used to form the bands such as iron, steel, copper, aluminum, and brass.

In preparing the sleeves prior to assembling the tube joints of the invention, it is the normal practice to maintain a sleeve, or a plurality thereof, in a bath comprising a preferred swelling agent until it is needed. The extent to which the sleeves will swell in a desired swelling agent when given adequate time to absorb the swelling agent is dependent on the temperature of the bath; consequently the desired degree of swelling may be regulated by the bath temperature. It is preferable in the practice of this invention to prevent swelling of the sleeves to any greater degree than is necessary to permit the sleeves to be easily applied to the ends of tubing. In order that a joint may be at least partly self-supporting from the moment it is assembled, it is desirable to swell the sleeves so that a small amount of force is needed to slip the sleeve over the end of the tube and a band fitted thereon. After half an hour or so, sufficient swelling agent will evaporate from the sleeve that the joint will be fairly rigid. After several hours exposure to the atmosphere, the joint will be ready for use. If the connected tubing is to be subjected to considerable pressure, an induction heat treatment such as hereinbefore described is applied at this time. The heat treatment may be performed preferably after at least 80% of the swelling agent has evaporated from the sleeve.

Carbon disulfide is one of the swelling agents which may be used to dilate the commercially important tube-forming material, polyethylene. Carbon disulfide is highly efficient as a swelling agent because it apparently may be absorbed into, and evaporated from, the polyethylene material without changing its chemical and physical properties; for example, the strength of the polyethylene is not appreciably changed. However, as carbon disulfide is inflammable, it is handled and applied in a manner to minimize the fire hazard. Trichloroethylene is also an efficient agent for swelling polyethylene and has the advantage of being relatively non-inflammable, although the strength of the polyethylene is slightly diminished after being subjected to a swelling and shrinking procedure. Other swelling agents for polyethylene include toluene, benzene, gasoline, and carbon tetrachloride.

In addition to polyethylene, tubings are commercially prepared from other organic thermoplastic materials such as polyvinyl chloride, vinyl chloride-vinyl acetate copolymer, polyvinylidene chloride and cellulose acetate. Joints made in accordance with the invention may be used to connect tubing comprising any of these materials. Various satisfactory swelling agents are available for dilating the sleeves used in making the joints. It is desired that the swelling agent merely swell but not dissolve or appreciably break-down the chemical structure of the organic tubing material. The swelling agents available include single chemical compounds which, at ordinary temperatures, are volatile liquids, and also blends of swelling agents and non-solvents, or blends of solvents and non-solvents. For example, the simple compounds ethyl alcohol or propylalcohol may be used as swellants for cellulose acetate. However, swelling agents for cellulose acetate may be produced by blending the solvent acetone with a non-solvent such as benzene, toluene, and/or gasoline. Either one of these non-solvents may be blended with other solvents for cellulose acetate such as ethyl methyl ketone, ethyl acetate, and butyl acetate.

Although no efficient solvent is presently known for high molecular weight polymer of vinyl chloride, ethyl acetate, methyl ethyl ketone, and acetone are efficient swelling agents whose swelling action may be modified by blending with such non-solvents as xylene, benzene, toluene, or alcohol. For example, a satisfactory swelling agent for polyvinylchloride has been prepared from a mixture comprising approximately by volume, 75 per cent meta xylene, 15 per cent acetone, and 10 per cent ethyl methyl ketone.

To swell the vinyl chloride-vinyl acetate copolymer, benzene, toluene, or chlorobenzene may be used, and also other swelling agents formed from blends of acetone, ethyl acetate, methyl ethyl ketone or amyl acetate with a non-solvent such as alcohol, aliphatic hydrocarbons, or petroleum oils.

Polyvinylidene chloride may be swelled by acetone, ethyl acetate, or any one of these swelling agents may be blended with the non-solvent, trichloroethylene. A non-solvent such as a petroleum oil and an alcohol may be blended with these swelling agents, if desired, to produce a modified swelling agent. Through proper selection of swelling agents or by blending solvents or swellants with non-solvents, and by controlling the temperature of the swellant selected at a desired level, the swelling of the sleeves used in forming the tube joints according to the present invention may be controlled in accordance with a desired fabricating procedure.

While preferred embodiments of the invention have been shown and described, it is to be understood that changes and variations may be made without departing from the spirit and scope of the invention as defined in the appended claims.

We claim:

1. A method of connecting the ends of tubes formed from an organic thermoplastic material, the steps thereof comprising enlarging a section of tubing formed from the material which has a normal inside diameter smaller than the external diameters of the tube ends to a diameter slightly greater than said external diameters, placing closely-fitting metallic bands about portions of the tubes adjacent said ends which continuously encircle respective tubes, inserting the end portions of the tubes including the bands supported thereon into the section of tubing, shrinking the section around said end portions and the bands, heating the bands inductively to fuse the material of the section and the portions of the tubes adjacent the bands.

2. A method of connecting the ends of tubes formed from an organic thermoplastic material comprising the steps of immersing a section of tubing of said material having a normal diameter smaller than the external diameter of the tubes in a bath comprising a volatile liquid swelling medium until the internal diameter of the section is greater than the external diameters of the tubes, placing metallic bands on the end portions of each of the tubes, inserting said tube portions including the bands mounted thereon into the section, holding the tube portions in abutting relationship and in telescopic relationship with the section until the section has shrunk thereabout, heating the bands inductively to fuse the material of the section and the tube portions adjacent the bands to form continuously circular welded regions in said material uniting the section and the portions.

3. A method as in claim 2 wherein the thermoplastic organic material is polyethylene and the swelling medium is carbon disulfide.

4. A method as in claim 2 wherein the thermoplastic material is polyethylene and the swelling medium is a compound from the group including trichloroethylene toluene, benzene, gasoline, carbon tetrachloride.

5. A method for connecting the ends of tubes formed from an organic thermoplastic material comprising the steps of immersing a short section of tubing of said material in a bath containing a volatile liquid for swelling the section, said section having a normal inner diameter smaller than the outer diameter of the tubes, controlling the temperature of the bath and the length of the time period during which said section of tubing is immersed to limit the degree of swelling to the extent that the section is readily slidable over the end-portions of the tubes, placing a thin metallic element about the end-portion of each tube which continuously encircles the tube, placing the end portions with the elements supported thereon within the section with the tube ends in abutting relationship until the swelling agent has substantially evaporated from the section, and heating the metallic elements until there is sufficient fusion of the material of the section and the tubes in contact with the elements to produce completely circular welded regions between the section and the tubes.

6. A method of forming a joint in tubing of organic thermoplastic material comprising the steps of encircling the end-portion of a tube with a tightly fitting metallic band, expanding a sleeve of said organic material having a normal internal periphery which is smaller than the external periphery of the tube by submerging the sleeve in a volatile liquid swelling medium until the inner diameter of the sleeve is large enough to allow the sleeve to receive the end-portion of the tube and the band extending therearound in telescopic relationship, thereupon bringing the sleeve and the end-portion of the tube into, and maintaining them in, said relationship until the swelling medium has substantially evaporated from the sleeve to shrink the sleeve tightly around the band of said end-portion, and inductively heating the band until the material of the sleeve and that of the tube adjacent the band is fused and joined together, and such material is joined to the band in adhesive relationship.

7. A method of connecting the ends of tubes formed from an organic thermoplastic compound from the group including polyethylene, polyvinylchloride, polyvinylidene chloride, cellulose acetate, and a copolymer of vinyl chloride and vinyl acetate, the steps of the method comprising: immersing a short section of tubing of said compound having a normal internal diameter smaller than the external diameters of the tubes in a bath comprising a volatile liquid swelling medium until the internal diameter of the section is greater than the external diameters of the tubes, applying a metallic band to a portion of each tube adjacent the end thereof to be connected whereby the band continuously encircles the tube, inserting said tube-portions including the bands mounted thereon into opposite ends of the section before substantial evaporation of the swelling agent, holding the tube portions in abutting relationship and in telescoping relationship with said section until the section is shrunk tightly thereabout, and heating the bands inductively to fuse the material of the section and the tube-portions adjacent thereto to form continuously circular welded regions comprising such material which unite the section and each tube.

8. A joint for connecting two tubes of organic thermoplastic material comprising a metallic element fitting tightly around an end portion of one of the tubes, the end portion of the other tube extending in exterior telescopic relationship to said end portion of the first tube and the element extending therearound, the material of the second tube being absorbent with respect to a volatile liquid swelling agent to expand said portion of the second tube, the diameter of said portion of the second tube being equal to or greater than the outside diameters of said portion of the first tube and the element when swollen by the swelling agent, and the normal inside diameter of said portion of the second tube in a free condition being less than the outside diameter of said portion of the first tube when the second tube is substantially free of the swelling agent, said portion of the second tube extending tightly around the first tube with the element embedded in adjacent surfaces of the overlapping portions, said element extending continuously around the first tube whereby it may be inductively heated, the material of said tubes in engagement with the element being fused thereto as the result of inductive heating of said element.

9. A joint as defined in claim 8 wherein the band comprises a section of wire formed into windings about said end portion of the first tube with the ends of the wire section connected.

10. A joint as defined in claim 8 wherein the element comprises a strip of thin gauge metal having a series of perforations along its length and a tab at one end thereof extending through one of said perforations near the other end of the element and being bent back on itself for connecting the ends of the element, said perforations being at least half as wide as the metal strip and the tab being almost as wide as the perforations.

11. A method of forming a joint in tubing of organic resinous material comprising the steps of placing a metallic band around the outer peripheral surface of a tube in tightly fitting relation therewith and in adjacent spaced relation with an end surface of the tube, submerging an end portion of another tube comprising said material which has a normal internal periphery smaller than said outer peripheral surface of the first tube in a volatile liquid swelling medium for said organic material until the inner diameter thereof is large enough to be slipped over the end of the first tube and said band, inserting the end portion of the first tube into the swollen end portion of the second tube until the band extending around the first tube is spaced inwardly from the end surface of the second tube extending around the first tube, and supporting the tubes to maintain said relationship until the swelling medium has substantially evaporated from the second tube and the portion thereof in overlapping relation with the first tube has shrunk tightly around the band and surfaces of the first tube at each side of the band.

12. A joint as defined in claim 8 wherein said element is spaced from exposed ends of said overlapping portions of the tubes.

13. A joint for connecting two tubes of organic thermoplastic material comprising a short sleeve of thermoplastic material, two continuous metallic bands, each band fitting tightly around an end portion of each of the tubes, said end portions of the tubes extending within the sleeve in telescopic relation therewith, said bands being entirely covered by the sleeve, the material of the sleeve being absorbent with respect to a volatile swelling agent to increase the inner diameter of the sleeve, the diameter of the sleeve when swollen by the swelling agent being equal to or greater than the outside diameters of the said portions of the tubes and the elements extending therearound, the normal inside diameter of the sleeve in a free condition being less than the outside diameter of said portions of the tubes when the sleeve is substantially free of the swelling agent, said elements extending continuously around respective tube portions whereby they may be inductively heated to fuse the material of the sleeve and the tube adjacent thereto, the material of the sleeve and the tubes in engagement with the bands being fused thereto as the result of inductive heating of the bands, the bands being embedded in said material.

References Cited in the file of this patent

UNITED STATES PATENTS

| | | |
|---|---|---|
| 414,686 | Dinn | Nov. 12, 1889 |
| 916,076 | Whitmore | Mar. 23, 1909 |
| 1,369,991 | Trautman et al. | Mar. 1, 1921 |
| 2,027,962 | Currie | Jan. 14, 1936 |
| 2,167,865 | Beecher | Aug. 1, 1939 |
| 2,249,091 | Robinson et al. | July 15, 1941 |
| 2,252,299 | McCoy | Aug. 12, 1941 |
| 2,356,902 | Walter | Aug. 29, 1944 |
| 2,372,929 | Blessing | Apr. 3, 1945 |
| 2,379,990 | Rembert | July 10, 1945 |
| 2,416,357 | Smith | Feb. 25, 1947 |
| 2,450,956 | Hart | Oct. 12, 1948 |
| 2,473,879 | Guarnaschelli | June 21, 1949 |
| 2,542,702 | Prow | Feb. 20, 1951 |
| 2,565,316 | Lucas et al. | Aug. 21, 1951 |
| 2,577,466 | Jones | Dec. 4, 1951 |

FOREIGN PATENTS

| | | |
|---|---|---|
| 252,516 | Great Britain | June 3, 1926 |
| 638,687 | Great Britain | June 14, 1950 |